June 1, 1965 R. G. KNIGHT ETAL 3,187,107

VOICE-FREQUENCY KEY-DIALING SUBSCRIBER'S STATION

Filed March 3, 1961 3 Sheets-Sheet 1

Inventor
R.G.KNIGHT-A.C.BEADLE
By [signature]
Attorney

June 1, 1965 R. G. KNIGHT ETAL 3,187,107

VOICE-FREQUENCY KEY-DIALING SUBSCRIBER'S STATION

Filed March 3, 1961 3 Sheets-Sheet 2

Inventor
R.G.KNIGHT-A.C.BEADLE
By [signature]
Attorney

VOICE-FREQUENCY KEY-DIALING SUBSCRIBER'S STATION

Filed March 3, 1961

3 Sheets-Sheet 3

Inventor
R.G.KNIGHT-A.C.BEADLE
By [signature]
Attorney

United States Patent Office 3,187,107

Patented June 1, 1965

3,187,107
VOICE-FREQUENCY KEY-DIALING SUBSCRIBER'S STATION

Ronald George Knight and Anthony Crisp Beadle, London, England, assignors to International Standard Electric Corporation, New York, N.Y.

Filed Mar. 3, 1961, Ser. No. 93,227
Claims priority, application Great Britain, Mar. 4, 1960, 7,721/60, 7,722/60
6 Claims. (Cl. 179—84)

Figure 1:
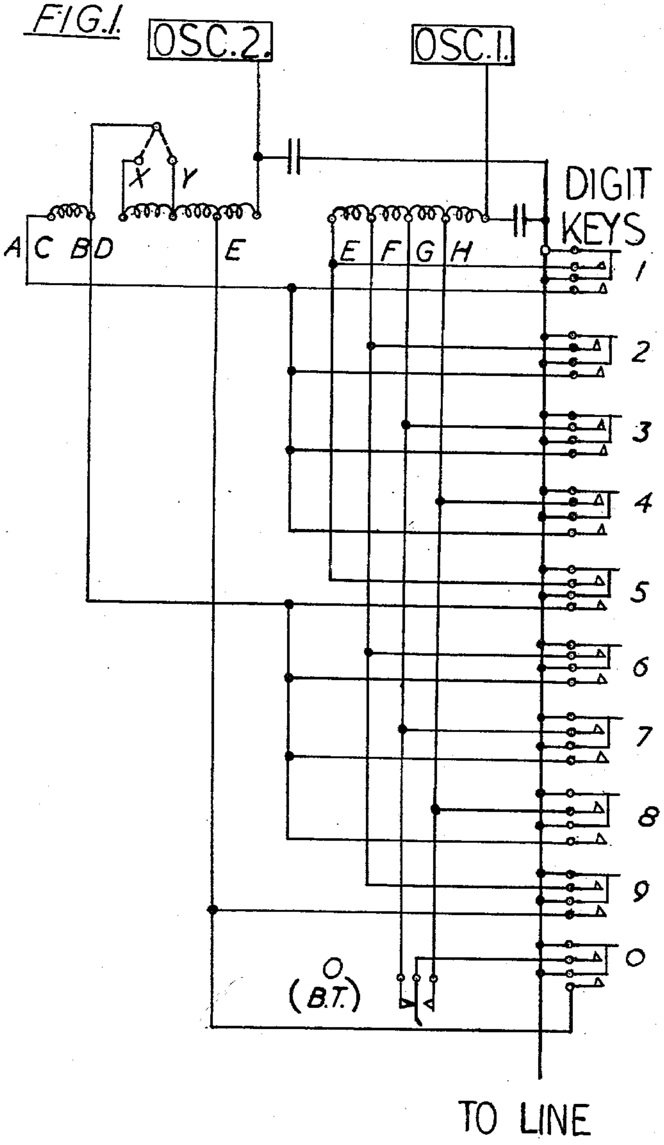

This invention relates to subscriber's station apparatus in automatic telecommunication exchange systems in which information signals from subscriber's station to exchange are transmitted by voice-frequency alternating currents with key sending.

The use of this method of signalling from subscriber's stations is well-known and is described in e.g. Bell System Technical Journal for March 1958 (Meacham et al.). Its main advantage is the increase of speed in transmitting information to the exchange which is obtainable by the use of key sending. It is particularly attractive for electronic exchange systems because it can be realised with much smaller line direct currents than can the ordinary D.C. dialling method, which is awkward to fit in with a fully electronic exchange system. The voice-frequency currents required may be generated by any suitable type of oscillator, the transistor oscillator being generally favoured owing to the low voltage and power necessary, but various other methods being also feasible. Several different frequencies are generated, and are transmitted to line by keys according to any predetermined code. These signals form the digits of the wanted number and will be received in a common register at the exchange.

It is generally necessary to allocate to each subscriber line one of several possible classes of service. The most frequently used of these is the barred-trunk service, in which particular subscribers are to be prevented from dialling directly a long distance call. Another type of service is the absent-subscriber service. It is also necessary to differentiate between the two parties of a two-party line.

The distinction between these classes of service, or between the parties of a two-party line, is difficult to arrange at the subscriber's set, especially if it is desired to maintain the same operating procedure for either party of a two-party line, so that this distinction is generally made by changing line circuit connections at the exchange. It would usually however be more economical, and simpler both technically and practically to make these changes at the subscriber's set, and this is made possible by the present invention.

Accordingly this invention provides a subscriber's set, in an automatic telecommunication system utilizing key-sending from the subscriber's sets and having different categories of service for the subscriber's lines, in which are provided apparatus means for adapting the circuit of the set to any required one of the said categories, generator means for generating alternating currents at a plurality of voice-frequencies, a keyset over which alternating currents in a plurality of combinations of the said voice-frequencies may be transmitted to the exchange from the said generator means to indicate the wanted number on the origination of a call, and circuit means by which the transmission of the said alternating currents to indicate the wanted number may also indicate the category to which the originating subscribers line belongs.

The principle of the invention also makes possible the facility of putting certain of the classes of service under direct control of the subscriber: e.g. a medical practitioner could, by means of a manual control, arrange for his incoming call to be transferred to another number during his absence.

The invention therefore also provides: A subscriber's set, in an automatic telecommunication system, utilizing keysending from the subscriber's sets, and having different categories of service for the subscriber's lines, in which are provided manually controlled switching means under the direct control of the user of the set for changing the category of service to which the associated subscriber's line belongs.

The choice of the number and value of the frequencies to be used, and of the type of coding, depends on a number of factors, such as:

(1) The frequencies must all be within the range which can be efficiently transmitted in a telecommunication system, and must be spaced sufficiently to avoid mutual interference in the receiver at the exchange.

(2) The number of frequencies transmitted simultaneously should be small, in order to have a minimum of separate oscillators to be accommodated in the subscriber's set, and also to simplify the decoding function of the receiver at the exchange.

(3) The receiver in the exchange must possess adequate voice-immunity, for example, it must not be affected by speech occurring while the wanted number is being transmitted. This is generally done by providing a guard circuit, which cancels the effect of any signal which includes extraneous frequencies. It needs a good spacing between frequencies, which reduces the total number of frequencies available. The guard circuit is also much easier to provide when 3 or 4 simultaneous frequencies are used than when only 2 are used, and more simultaneous fresuencies would mean fewer frequencies in all and consequently a better spacing.

(4) The changes to the subscriber's set to adapt it to produce different signals for any purposes, such as two-party line discrimination or class of service variation, should be as simple as possible.

In view of the foregoing requirements and limitations, it will be apparent that the greatest advantage will accrue if as many different combinations as possible from a limited number of frequencies are used.

The signals are discriminated at the exchange in a signal receiving circuit by various means, for example, by using the well-known properties of filters. If different degrees of discrimination were to be provided, e.g. by using a wide-band filter and a narrow-band filter, it would be possible to use a group of closely spaced frequencies, to give the same indication for any one of the group through a wide-band filter, and a different indication for each one of the group through a narrow-band filter.

Figure 2:
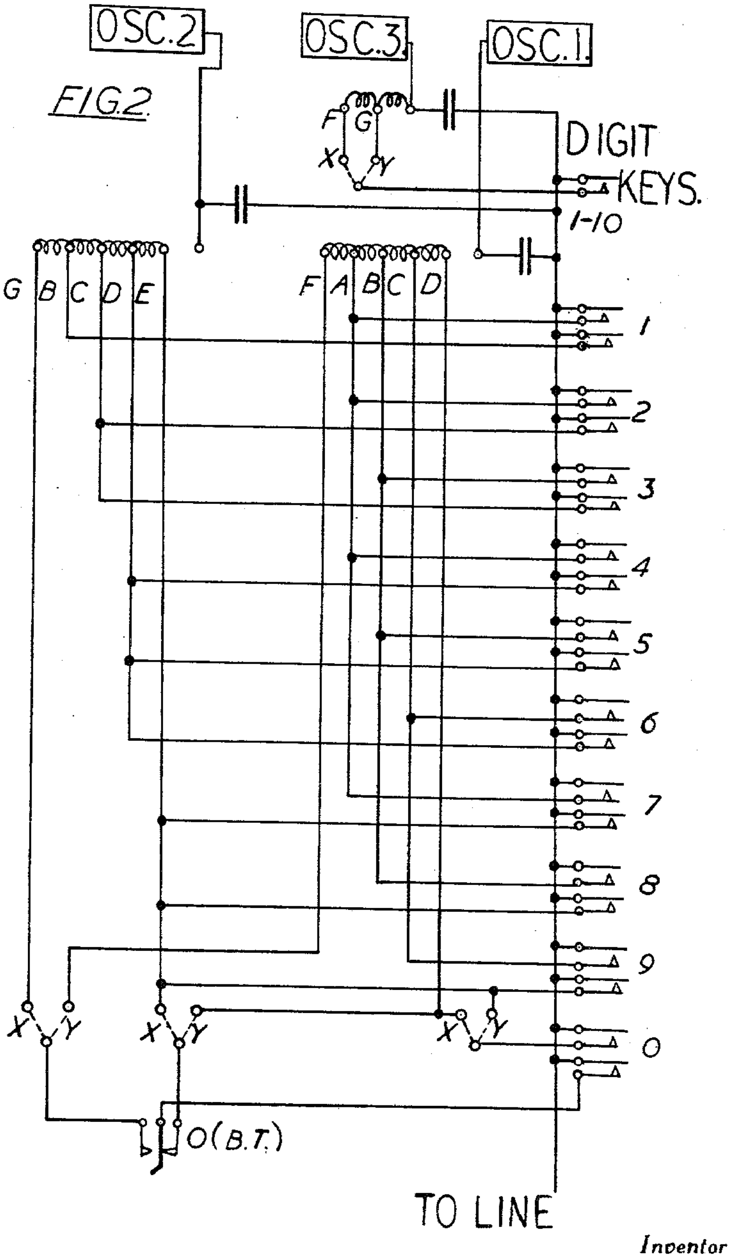
Figure 3:
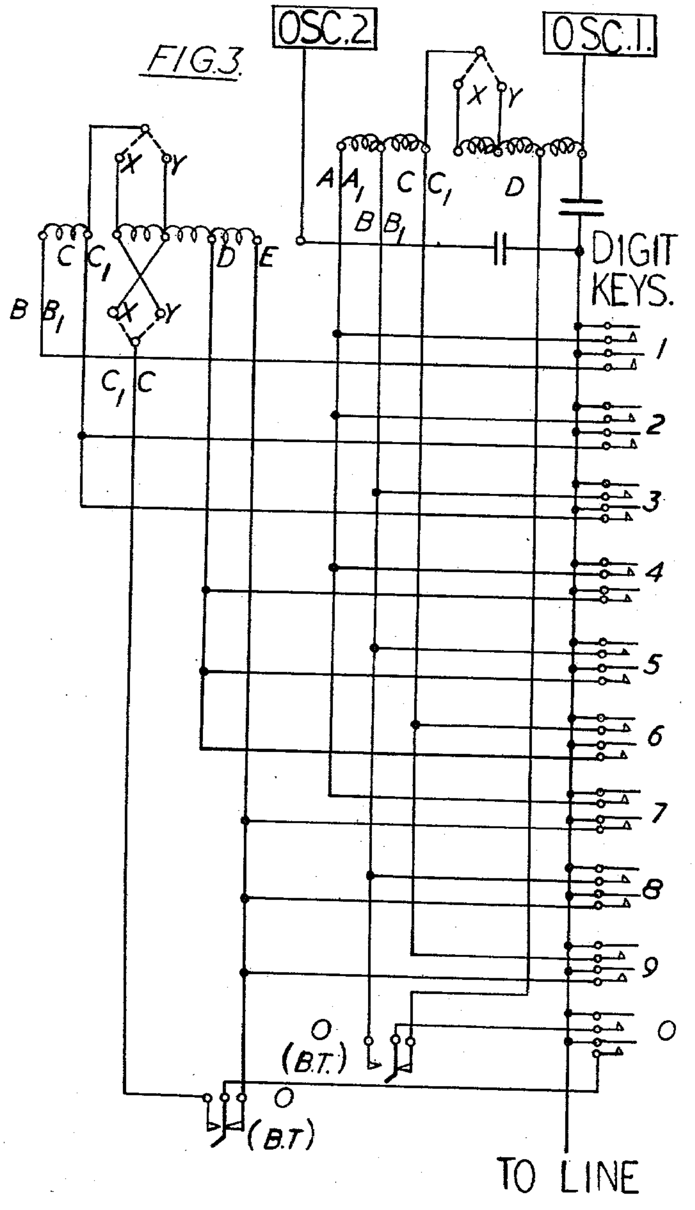

Three embodiments of the invention will now be described with reference to the accompanying drawings, in which:

FIG. 1 refers to the first embodiment,

FIG. 2 refers to the second embodiment,

FIG. 3 refers to the third embodiment, and each shows a circuit for digit keys, means for two-party line and class of service discrimination, and the frequency-tuning circuits of a plurality of oscillators, all intended to be incorporated in a subscriber's set.

Each frequency-tuning circuit consists of a capacitor and an inductance with a number of tappings, this circuit forming part of an oscillator of suitable known design (not shown). Each tapping is connected in circuit through one or more pairs of springs on the set of digit keys as shown, according to the codes used. Thus on the depression of any one of these keys, frequencies are produced by the oscillator according to the tappings connected. The current so generated goes out over the subscriber's line and effects the storage in the exchange register of the digit sent.

On the drawings the frequencies are indicated by letters adjacent to the tapping points. Digit keys are shown with two make pairs each, though one double make may generally be used with advantage provided that the oscillator circuits permit. It would be necessary for each digit key, on operation, to prevent interference from the microphone while a signal is being sent, so that an additional spring-set would be necessary on each key; it could however be common mechanically to all keys. This spring set is not shown on the drawings. The distinction between X and Y subscriber's sets for a two-party line is made by alteration of strappings, which are marked X and Y on the drawings. X is shown as giving the lower frequency, though this of course is immaterial. An exclusive line also uses the X frequency.

The class of service considered in all the embodiments is the barred trunk restriction on dialling 0, but many other classes of service are also possible. This facility is shown in the drawings as a locking key, i.e. manually controlled, but could be provided by strapping if required; the keys are marked 0 (B.T.) on the drawings. The use of a locking key mounted externally would give the subscriber control of the class of service, if required, e.g. to enable a medical practitioner to have incoming calls transferred elsewhere during his absence.

*First embodiment*

In this embodiment, FIG. 1, having two oscillators, the first oscillator has four trappings, giving four different frequencies E, F, G, H, as shown on FIG. 1. In the second oscillator the inductance can be altered by removing the strap on the left-hand winding from point X and connecting it to point Y. The X connection is used on subscriber's sets for the X party of two-party lines or for an exclusive line, giving frequencies A, B, E, and the Y connection for the Y party, giving frequencies C, D, F. On the drawing, each pair of frequency designations A and C, or B and D, correspond to the two-party designations X and Y respectively.

The frequency codes chosen for this embodiment are as follows, the first frequency quoted arising from the first oscillator:

| Digit | Exclusive or X party frequencies | Y party freqs. |
|---|---|---|
| 1 | E A | E C |
| 2 | F A | F C |
| 3 | G A | G C |
| 4 | H A | H C |
| 5 | E B | E D |
| 6 | F B | F D |
| 7 | G B | G D |
| 8 | H B | H D |
| 9 | F E | |
| 0 | G E | for either party |
| 0 (barred trunks). | H E | |

This arrangement fits an exchange system in which it is not necessary to discriminate on 9 or 0 for two-party lines. There are 8 frequencies to be generated and a total of 19 codes to be decoded at the exchange, and it will be seen that this gives the most economical arrangement for the facilities required. With, say, 15% separation, the frequencies required would be contained within the range 700 to 1850 cycles per sec., and are lettered A to H on the drawing. The use of as many as eight frequencies may however make voice-immunity more difficult to obtain.

The changes required for two-party discrimination and barred trunk service are simple. If necessary, two more codes HF and GF could be obtained by an extra tapping giving frequency F, on the second oscillator inductance, without increasing the total number of frequencies.

*Second embodiment*

The second embodiment, FIG. 2, uses three oscillators, and is arranged to use the same two-out-of-five code for subscriber's key-sending as has already been adopted for national and international long-distance dialling. This may have overall system advantages, in that the same general decoding arrangement in the register could be used for calls from either subscribers or long-distance. This digit code is produced from two of the oscillators, using five frequencies A, B, C, D, E. The corresponding frequency values, as adopted for national dialling are 700, 900, 1100, 1300 and 1500 cycles per sec. respectively. The third oscillator produces two other frequencies, F, G, one for each party. Thus every code has three frequencies, the codes being the same as the national dialling code plus a third frequency F for single or X parties, or G for Y parties. This arrangement has the double advantage that there are only seven frequencies, leaving more room in the spectrum for guard frequencies, and also that the use of three frequencies for each code requires much less stringent guard circuits, or alternatively allows for some relaxation on the limits of signal length. The disadvantage is of course the provision of three oscillators in the subscriber's set.

The digits are stored directly in two-out-of-five code at the exchange, ignoring the third frequency, and the party discrimination is done by the third frequencies F and G, which may conveniently be in the lower end of the spectrum, e.g. 600 and 800 cycles respectively.

The codes shown for digit 0 (barred trunks) give party discrimination as well, and are shown to need minimum strapping changes on the subscriber's set. For this purpose extra tappings on the inductances are used, to give frequency F from the 1st oscillator and G from the 2nd oscillator. Three other codes remain available for other classes of service if required.

The frequency codes used in this embodiment are thus:

| Digit | Exclusive or X party freqs. | Y party freqs. |
|---|---|---|
| 1 | A B F | A B G |
| 2 | A C F | A C G |
| 3 | B C F | B C G |
| 4 | A D F | A D G |
| 5 | B D F | B D G |
| 6 | C D F | C D G |
| 7 | A E F | A E G |
| 8 | B E F | B E G |
| 9 | C E F | C E G |
| 0 | D E F | D E G |
| 0 (barred trunks) | D F G | E F G |

The digit keys for this embodiment need three pairs of springs each. In FIG. 2, the pairs of springs for the third oscillator are multipled over all keys and represented by one pair marked "1–10." In order to reduce the number of springs on each key, it would be an advantage to provide one pair of springs operable through a common linkage by any digit key, for this third oscillator circuit.

*Third embodiment*

The drawing FIG. 3, shows a circuit using two oscillators, and an arrangement for using the same two-out-of-five code for subscriber's key sending as has already been adopted for national and international long-distance dialling, i.e. as used in the second embodiment.

The inductances are tapped to give several frequencies, and some of these can be altered by changing the strapping to distinguish between the two parties X and Y. The first oscillator produces four frequencies A, B, C, D, in the X party position, the first three being changed to $A_1$, $B_1$, $C_1$, respectively in the Y party position. The second oscillator produces five frequencies B, C, $C_1$, D, E, in the X party position, the first three being changed to $B_1$, $C_1$, C, respectively in the Y party position. The subscript "1" is used to indicate that the difference between frequencies A and $A_1$, or B and $B_1$, or C and $C_1$ is much smaller than the difference between any other pair of frequencies. Each double frequency description on the drawing is in the order XY, as before.

The advantage of this arrangement will appear on considering the frequency codes chosen for this embodiment, which are as follows, the first frequency quoted arising from the 1st oscillator:

| Digit | National code freqs. | Exclusive or X party freqs. | Y party freqs. |
|---|---|---|---|
| 1 | 700 900 | A B | $A_1$ $B_1$ |
| 2 | 700 1100 | A C | $A_1$ $C_1$ |
| 3 | 900 1100 | B C | $B_1$ $C_1$ |
| 4 | 700 1300 | A D | $A_1$ D |
| 5 | 900 1300 | B D | $B_1$ D |
| 6 | 1100 1300 | C D | $C_1$ D |
| 7 | 700 1500 | A E | $A_1$ E |
| 8 | 900 1500 | B E | $B_1$ E |
| 9 | 1100 1500 | C E | $C_1$ E |
| 0 | 1300 1500 | D E | D E |
| 0 (barred trunks) | | B $C_1$ | $B_1$ C |

The second column gives the actual frequencies already adopted for national dialling, which produce the same codes as given in the third column if frequencies A, B, C, D, E, have the values 700, 900, 1100, 1300 and 1500 cycles per sec. respectively. Each code for the Y party is different from that for X, except for digit 0 for which no party discrimination is required in this embodiment.

Since the two frequencies with and without subscript are close to each other in value, there is provided in the register in the exchange a set of wide-band filters which will sort the digits correctly whichever party is calling, so that the digits are stored in the register in the two-out-of-five pattern in the same way as for an ordinary exclusive line. Then in addition a set of narrow-band filters is used to detect a "subscript" frequency and so indicate a Y party call.

It may be mentioned that the actual, or the proportional, frequency difference will vary somewhat with frequency, since it is produced by inserting or removing a fixed number of turns of the inductance. Thus the frequency difference used will depend on the characteristics of the filters available over the whole range of frequencies.

The arrangement for digit 0 (barred trunks) is shown for a possible requirement that party discrimination shall also be obtainable. Accordingly a pair is chosen from the usable spare codes which gives the most convenient strapping, the narrow-band filter discriminating for the digit as well as for the party. If the barred trunk call does not require party discrimination, code C $C_1$ for X party, becoming $C_1$ C for Y party, could be used.

Although there are eight frequencies involved, voice-immunity would probably be somewhat easier to manage than would appear, because of the arrangement of frequencies in pairs.

The advantage of the arrangement is that the signal receiving equipment for the numerical digits is no more complex for party lines than it would be for exclusive lines, and at the same time the party is determined by a simple discrimination between two frequencies.

It will be appreciated that the codes quoted in all these embodiments are typical examples, those in the second and third embodiments being chosen to agree with the proposed national dialling codes, and in many cases variations could be found which would produce the same effects, as far as the invention is concerned, as those actually quoted. Similarly the necessity for classes of service other than "barred trunks" may also arise, and could be met by using available codes which are otherwise spare.

It is to be understood that the foregoing description of specific examples of this invention is not to be considered as a limitation on its scope.

What we claim is:

1. In a voice-frequency key-dialing subscriber's station for multi-station telephone lines, a plurality of generator means, each generating a group of steady state, separate voice-frequency signals, a plurality of digit-selection keys corresponding respectively to the digit values of any digit of a telephone number, means controlled by the operation of any of said keys for transmitting a unique combination of voice-frequency signals characteristic of the digit key operated, and selectively operable restricting means associated with a predetermined one of said keys for altering the said unique combination of voice-frequency signals transmitted thereby to a different combination of voice-frequency signals.

2. A voice-frequency key-dialing subscriber's station as set forth in claim 1 wherein said different combination of voice-frequency signals is unique.

3. A voice-frequency key-dialing subscriber's station as set forth in claim 1 wherein the said unique combination of voice frequency signals include voice frequency signals from each of said groups.

4. A voice-frequency key-dialing subscriber's station as set forth in claim 1 wherein the said unique combination of voice-frequency signals includes a single frequency from each of said groups of signals.

5. In a voice-frequency key-dialing subscriber's station for multi-station telephone lines, a plurality of generator means, each generating a group of steady state, separate voice-frequency signals, a plurality of digit-selection keys corresponding respectively to the digit value of any digit of a telephone number, station identifying means in each station for marking its position on said multi-station line, means controlled jointly by said station identifying means and by the operation of any of said keys for transmitting a unique combination of voice-frequency signals characteristic of the digit key operated and the station position of the station including the operated digit key, and selectively operable restricting means associated with a predetermined one of said keys for altering the said unique combination transmitted thereby to a different combination of voice-frequency signals.

6. A voice-frequency key-dialing system as set forth in claim 5 wherein the said different combination of voice-frequency signals are characteristic of the station position of the station including the operated restricting means.

References Cited by the Examiner

UNITED STATES PATENTS

| | | | |
|---|---|---|---|
| 1,916,229 | 7/33 | Miller | 178—66 |
| 2,332,912 | 10/43 | Hecht et al. | 179—84 |
| 2,542,592 | 2/52 | Styren | 179—84 |
| 2,554,201 | 5/51 | Lundkvist | 179—90 |
| 2,824,173 | 2/58 | Meacham | 179—17 |
| 2,951,911 | 9/60 | Van Lottum et al. | 179—90 |
| 2,966,659 | 12/60 | Dahlbom et al. | 179—84 |
| 2,986,603 | 5/61 | Meacham | 179—17 |
| 3,060,275 | 10/62 | Meacham et al. | 179—84 |
| 3,100,245 | 8/63 | Feldman | 179—84 |
| 3,140,358 | 7/64 | Martens | 179—84 |

ROBERT H. ROSE, *Primary Examiner.*

L. MILLER ANDRUS, WALTER L. LYNDE, *Examiners.*